H. HOULDSWORTH.
AXLE AND BEARING FOR VEHICLES.
APPLICATION FILED NOV. 28, 1908.
956,579.
Patented May 3, 1910.
2 SHEETS—SHEET 1.
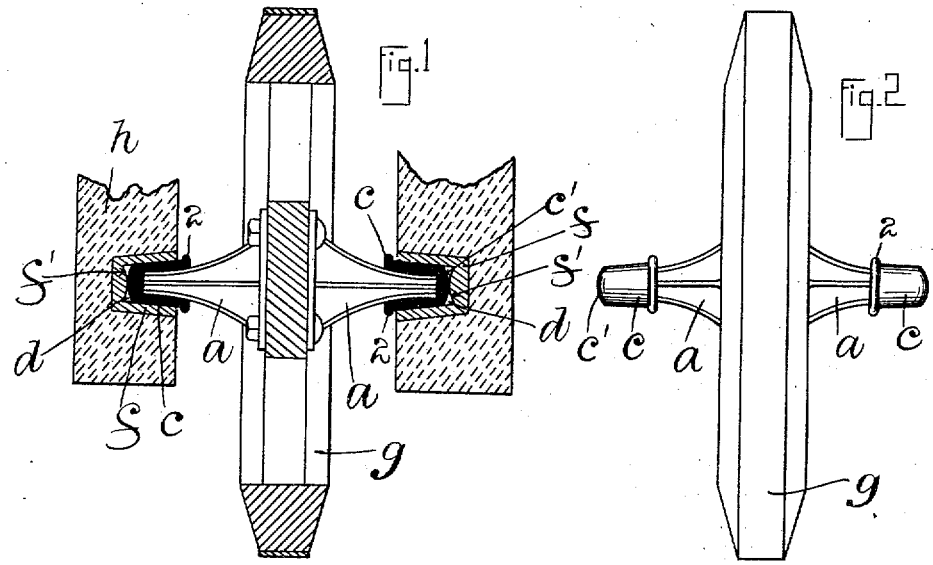
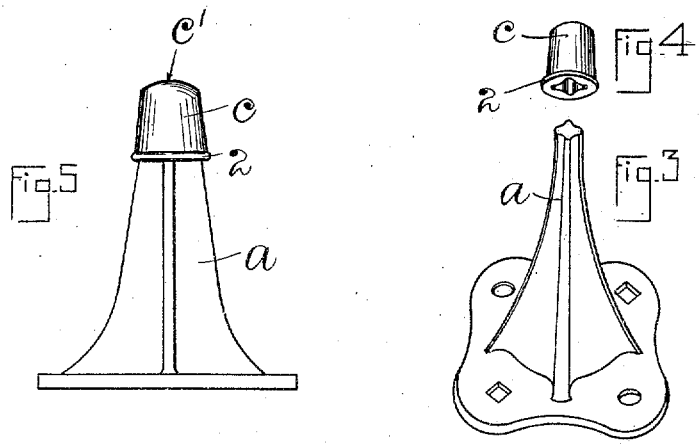
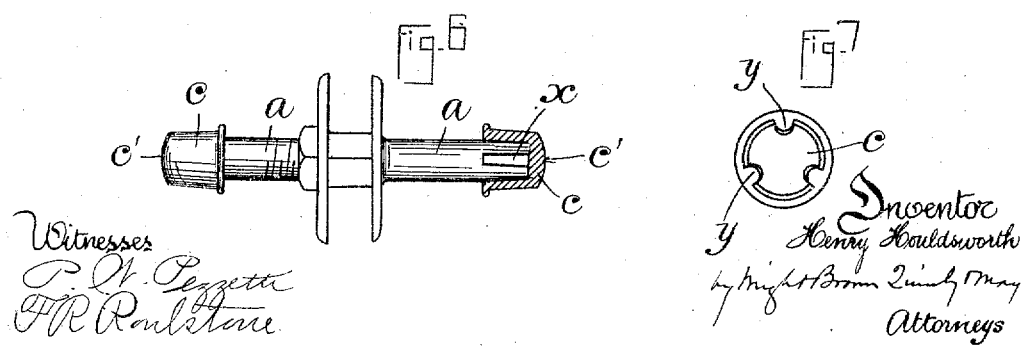

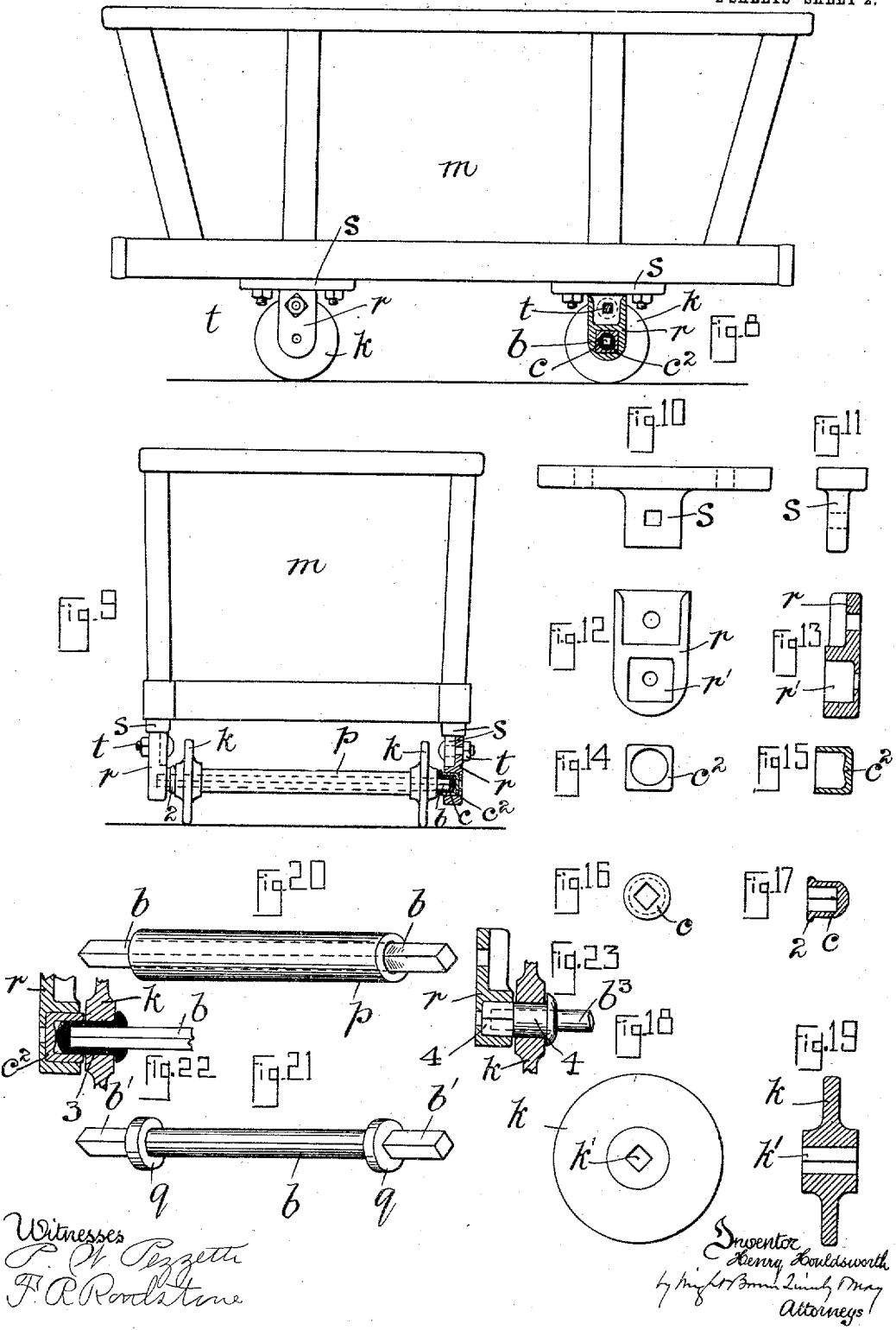

UNITED STATES PATENT OFFICE.

HENRY HOULDSWORTH, OF KEIGHLEY, ENGLAND.

AXLE AND BEARING FOR VEHICLES.

956,579.     Specification of Letters Patent.     Patented May 3, 1910.

Application filed November 28, 1908. Serial No. 464,935.

*To all whom it may concern:*

Be it known that I, HENRY HOULDSWORTH, a subject of the King of Great Britain, and resident of No. 1 Stanley road, Ingrow, Keighley, in the county of York, England, have invented a certain new and useful Improvement in Axles and Bearings for Vehicles, Colliery-Trucks, and Like Vehicles, of which the following description, having reference to the accompanying sheets of drawings, is a specification.

My invention relates to axles for wheelbarrows, colliery trucks and like vehicles wherein the axles of the wheels revolve in fixed metal bearings. In this class of devices it is well known that on account of grit or other abrading substances entering said bearings and intervening between same and the metal axles of the wheels, such axles are caused to deteriorate or wear away very quickly and therefore entail considerable outlay in their replacement or in the substitution of new or unworn ones for them.

To provide means which when in use, will be subjected to all said wear or deterioration and which may be readily replaced or have unworn parts substituted for them and that will protect the axle shafts at all times against such wear is the object of my present invention. To attain this object I make use of the devices hereinafter described and as illustrated by the accompanying sheets of drawings, wherein:—

Figure 1 is a sectional elevation of the wheel of a wheelbarrow and its bearings. The axle is shown intact or not in section. Fig. 2 is an edge view of a similar wheel and its axle to those shown by Fig. 1, and further shows certain of my improved parts mounted upon said axle. Figs. 3 and 4 are perspective views of a portion of an axle (as shown by Figs. 1 and 2) and a part which takes over same respectively. Fig. 5 is an elevation of the parts shown by Figs. 3 and 4 as when one part is mounted upon the other. Fig. 6 is an elevation showing a common form of wheel barrow-axle arranged to receive certain of my improved devices. Fig. 7 is an end elevation of one of my devices as formed to fit over the type of axle shown by Fig. 6. Fig. 8 is a side elevation of a colliery truck or corve showing the application thereto of my improved devices, certain of which are shown (at the right of the figure) in section while the others (to the left) are in elevation. Fig. 9 is an end view of parts shown by Fig. 8, and here also certain of the parts on the right of the figure are in section while the other parts to the left are in elevation. Figs 10 and 11 are front and end elevations of a certain fixed part of the bearings. Figs. 12 and 13 are front and sectional views of a detachable part of the bearing. Figs. 14 and 15 are end and sectional views of a detachable bush that is formed to take into the opening made in the part shown by Figs. 12 and 13. Figs. 16 and 17 are end and sectional views of a sleeve or thimble which is formed to take over the end of the axle and to fit within the opening in the bush shown by Figs. 14 and 15. Figs. 18 and 19 are side and sectional elevations of a wheel as used in conjunction with the other parts illustrated. Fig. 20 is a view in perspective illustrating the form of axle and a part in connection therewith that I preferably make use of in connection with the other parts illustrated by Figs. 8 to 19 inclusive. Fig. 21 is also a perspective view of a comomn kind of colliery-truck axle modified to act in conjunction with my improved parts. Fig. 22 is a sectional elevation of modified parts hereinafter explained. Fig. 23 is also a sectional elevation showing devices which displace others as hereinafter described.

Similar letters and figures of reference indicate similar parts throughout the several views.

To attain the object of my invention, instead of forming the outer ends of the axles *a* or *b* preferably circular, round or cylindrical I now form of such shape in cross section that on mounting thereon thimbles or shields *c* these will be held against rotation on such axles *a* or *b*, but will at all times rotate with them (said axles *a* and *b*), thus by said thimbles *c* having their outer or peripheral surfaces circular in cross section to take within the circular holes or openings *d* of their bearings or bushes *f*, said outer surfaces of the thimbles *c* are alone subjected to wear and not any part of the axle *a* or *b* is at such time in any way deteriorated. As said thimbles *c* are of simple formation and may easily be removed when worn and others substituted for them, any deterioration of them may be readily and cheaply repaired. The outer ends *c'* of the thimbles *c* are preferably somewhat of hemispherical shape for contact with the similarly shaped inner walls *f'* of the bushes *f* so that the one will revolve about the other on surfaces that engender little friction.

The axles *a* which are used for the wheels *g* of wheel barrows, we preferably form in parts as shown by the several figures, while the bushes *f* used in connection with such axles are made to fit into the usual wooden bearings *h* thereon in manner well known. Or these axles *a* may be of the old form shown by Fig. 6, in which case grooves *x* are made to receive ridges *y* (Fig. 7) formed within the thimbles *c* thus to insure the rotation of said thimbles with said axles.

The axles *b* which are for use with the wheels *k* of the corve or colliery truck *m* are preferably square in cross section as same may be thus more cheaply produced since they may be cut to the desired length from any rolled bar of metal. The wheels *k* which take over these axles have correspondingly formed openings *k'* made in them so that as said wheels revolve so also will the axles *b*, while simple pieces of tubing *p* may be placed loosely over said axles *b* to intervene between the wheels *k* in order to keep same the proper distances apart from each other. Or where the ordinary form of axle *b* as shown by Fig. 21 is employed then the hoops *q*, *q*, will keep said wheels apart, while their ends *b'* are square in cross section to receive the wheels *k*. In connection with the axles *b* and their bearings for enabling their use on corves or colliery trucks *m*, I employ a detachable part *r* which has an opening *r'* of proper shape to receive the bush $c^2$, and this part *r* is formed to span the bearing part *s* which is fixed to the base of the truck *m*, so that one bolt *t* may secure it in position and therefore afford facilities for its removal. To strengthen the outer ends of the thimbles *c* a flange 2 is formed thereon as shown in the several figures.

In cases where it is desirable that the two wheels on one axle *b* should revolve independently of each other then we form one of the thimbles 3 to extend, as shown by the sectional view, Fig. 22, through the wheel *k* and the axial opening in this wheel *k* is then circular to allow the wheel to revolve on the outer surface of said thimble 3. If desired, both of the wheels on the same axle might have thimbles such as 4 for the wheels *k* to revolve upon as shown by Fig. 23 in which case the bush is dispensed with and the thimble 4 is made to be held against rotation by the bearings *r* and the wheels *k* revolve loosely upon the said thimbles 4, while the axle $b^3$ may be round or cylindrical as it may or may not revolve as circumstances demand.

Such being the nature and object of my invention, what I claim is:—

1. The combination with an axle of cup shaped thimbles secured to the ends of the axle to rotate therewith, the exterior of the closed ends of said thimbles being substantially hemispherical, and bushings in which said thimbles are free to rotate, the ends of said bushings contacting with the ends of said thimbles.

2. The combination with an axle of cup shaped thimbles secured to the ends of the axle to rotate therewith, the exterior of the closed ends of said thimbles being substantially hemispherical, and bushings in which said thimbles are free to rotate, the inner end walls of said bushing being also substantially hemispherical.

3. The combination with an axle having an angular cross section, of cup shaped thimbles fitting over the ends of said axle, and having substantially hemispherical ends, and bushings in which the said thimbles are free to rotate.

4. The combination with an axle of cup shaped thimbles secured to the ends of the axle to rotate therewith, said thimbles having substantially hemispherical ends, bushings in which said thimbles are free to rotate, detachable bearings for said bushings.

5. The combination with an axle, of cup shaped thimbles secured to the ends of the axle to rotate therewith, said thimbles having substantially hemispherical ends, bushings in which said thimbles are free to rotate, wheels operatively connected with said axle, and spacing means between said wheels.

6. The combination with a rotatable axle, of a cup shaped thimble secured to one end of the axle to rotate therewith, said thimble having a substantially hemispherical end, a bushing in which said thimble is free to rotate, and a wheel free to rotate on said thimble.

7. The combination with a rotatable axle, of a cup shaped thimble secured to one end of the axle to rotate therewith, said thimble having a substantially hemispherical end, and an annular flange, a bushing in which said thimble is free to rotate, and a wheel free to rotate on said thimble.

8. The combination with an axle, of cup shaped thimbles secured to the ends of the axle to rotate therewith, said thimbles having substantially hemispherical ends, bushings in which said thimbles are free to rotate, each of said thimbles being provided at its open end with an annular flange.

In testimony whereof I have hereunto affixed my signature in presence of two witnesses.

HENRY HOULDSWORTH.

Witnesses:
SAMUEL HEY,
JOHN WHITEHEAD.